B. C. WILSON.
CASKET CUTTER.
APPLICATION FILED OCT. 8, 1918.

1,308,650. Patented July 1, 1919.

Witnesses
James F. Crown
N. L. Collame

Inventor
Baxter C. Wilson,
Richard B. Owen,
Attorney

UNITED STATES PATENT OFFICE.

BAXTER C. WILSON, OF WEST MARION, SOUTH CAROLINA.

GASKET-CUTTER.

1,308,650.                    Specification of Letters Patent.         Patented July 1, 1919.

Application filed October 8, 1918. Serial No. 257,371.

*To all whom it may concern:*

Be it known that I, BAXTER C. WILSON, a citizen of the United States, residing at West Marion, in the county of Marion and State of South Carolina, have invented certain new and useful Improvements in Gasket-Cutters, of which the following is a specification.

This invention relates to cutting and punching sheets and bars, and more especially to cutters of this kind having a sweep; and the object of the same is to produce a tool which may be rotated by the ordinary brace or bit stock and which will cut a gasket or washer from any material sufficiently thin to be handled by the cutter.

The invention consists in the specific means for adjusting the cutter arms and other details which will be brought out in the following specification and claims.

Referring to the drawings.

Figure 1:
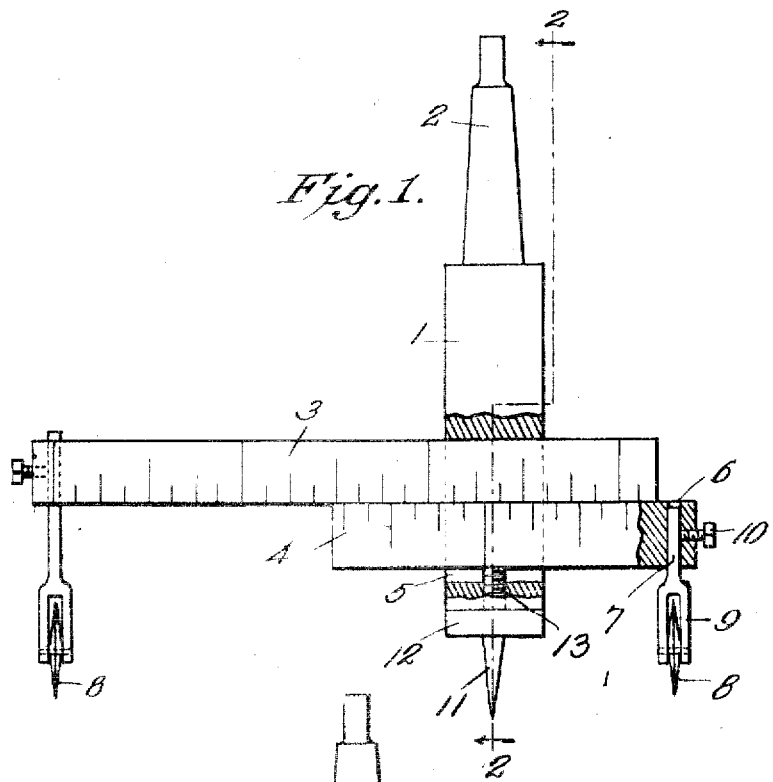
Figure 1 is a side elevation of this tool partly broken away and in section.
Figure 2:
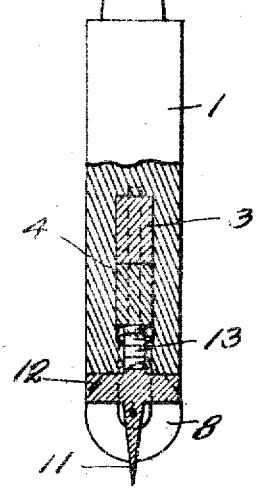
Fig. 2 is a vertical section on the line 2—2 of Fig. 1.

The body 1 is an upright element reduced at its upper end into a shank 2 for insertion into the lower end of a bit stock or brace such as is ordinarily employed for boring holes, and this body has through it a large opening in which is mounted two arms or bars 3 and 4, superposed upon each other within said hole 5 in which their inner ends lap, as shown in Fig. 1. In the outer end of each arm is an upright opening 6 into which is inserted the shank 7 of a fork carrying the cutter, the latter being herein shown as a wheel 8 rotatably mounted in the lower end of the holder, while its shank is held in the opening 6 by means of a set screw 10.

The center on which this device revolves is made up of a point 11 whose upper end is enlarged into a head 12 and continued upwardly in a screw threaded shank 13 which engages a threaded opening in the lower end of the body 1, and passes through the same into the transverse opening 5 and binds the two arms 3 and 4 therein. The parts are assembled as shown. Before the set screw 13 is adjusted upward to hold the arms, they are adjusted to the required or desired distances, so that one cutter wheel 8 will cut the inside of the washer and the other the outside of the same in a manner well understood. The head 12 is then grasped by the thumb and finger or by a suitable tool and turned until the screw 13 binds the two arms 3 and 4 in place, maintaining the exact position of the point 11 as seen. The tool is now inserted into the lower end of a bit stock, the point centered in the material, and when the whole is rotated, the washer is readily cut from sheet material, in a manner which will be clear. If several thicknesses are to be cut at one time, the point 11 obviously must extend for some distance below the cutters so as to pierce the several thicknesses of material before the cutters act on the uppermost. Since the screw 13 may not be retracted to drop the point, because that would loosen its grip on the arms 3 and 4, the set screws 10 can be loosened and the shanks 7 of the cutter holders run up in the outer ends of the arms, and thus effect the same relative adjustments of parts.

I have found this device especially useful in cutting washers from hard fiber paper or other extremely soft material, because it saves a wastage of paper and the destruction of the articles cut in the act of cutting them. However, it may be equally as serviceable for cutting washers from sheet rubber, leather, and even metal or other materials, and in its use I do not wish to be limited.

The foregoing description and the drawings have reference to what may be considered the preferred, or approved form of my invention. It is to be understood that I may make such changes in construction and arrangement and combination of parts, materials dimensions, et cetera, as may prove expedient and fall within the scope of the appended claims.

Having thus fully described my invention, what I claim as new and desire to secure by Letters Patent, is:—

1. In a gasket cutter, the combination with an upright body having a transverse opening, a pair of arms lapping each other therein and having upright openings in their outer ends, forks whose shanks are mounted in said openings, set screws in the arms against said shanks for permitting their vertical adjustment, and rotary cutters mounted in the forks; of a centering point having a head at its upper end, and a threaded shank continuing the head upward and adapted to be screwed into the lower end of said body against the lowermost of said lapping arms, for the purpose set forth.

2. In a gasket cutter, the combination with an upright body having means at its upper end for rotating the same, such body being provided with a transverse opening, and a set screw in the lower end of said body projecting upward into the opening; of a pair of arms of different lengths lapping each other in superposed relation within said opening and held therein by the adjustment of said set screw, each arm having an upright opening at its outer end, and for each arm a cutter comprising a fork whose shank projects upward into one of said openings, and whose lower end carries the cutter, and a set screw bearing against said shank.

In testimony whereof I affix my signature in presence of two witnesses.

BAXTER C. WILSON.

Witnesses:
B. J. BROWN,
E. R. BROWN.